US011776508B2

(12) United States Patent
Lee et al.

(10) Patent No.: US 11,776,508 B2
(45) Date of Patent: Oct. 3, 2023

(54) PRE-DISPLAY ADAPTIVE CODEWORD MAPPING FOR DISPLAY MONITOR WITH NON-IDEAL ELECTRO-OPTICAL TRANSFER FUNCTION

(71) Applicant: ATI TECHNOLOGIES ULC, Markham (CA)

(72) Inventors: Shu Key Keith Lee, Markham (CA); David I. J. Glen, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 303 days.

(21) Appl. No.: 16/729,795

(22) Filed: Dec. 30, 2019

(65) Prior Publication Data

US 2021/0201852 A1 Jul. 1, 2021

(51) Int. Cl.
*H04N 5/57* (2006.01)
*H04N 19/124* (2014.01)
(Continued)

(52) U.S. Cl.
CPC ................. *G09G 5/37* (2013.01); *G09G 5/10* (2013.01); *G09G 2330/12* (2013.01)

(58) Field of Classification Search
CPC .......... G09G 3/32; G09G 3/3233; H04N 5/57; H04N 5/35721; H04N 9/04519; H04N 9/31; H04N 9/68; H04N 9/73; H04N 9/77; H04N 19/14; H04N 19/124; H04N 19/60; H04N 19/186; H04N 19/18; H04N 19/36; H04N 19/169; H04N 19/33; H04N 19/132; H04N 19/167; H04N 19/615; H04N 19/98; H04N 19/70; H04N 19/85
See application file for complete search history.

(56) References Cited

U.S. PATENT DOCUMENTS

2017/0034520 A1* 2/2017 Rosewarne ............. G06T 5/009
2017/0103691 A1* 4/2017 Hoffman .............. G09G 3/2003
2018/0204528 A1* 7/2018 Miyazawa ........... G09G 3/3413

FOREIGN PATENT DOCUMENTS

JP 2017050840 * 3/2017

OTHER PUBLICATIONS

Wikipedia "Cubic Hermite spline", https://en.wikipedia.org/wiki/Cubic_Hermite_spline, accessed Nov. 24, 2019, 5 pages.

(Continued)

*Primary Examiner* — Chanh D Nguyen
*Assistant Examiner* — Nguyen H Truong

(57) ABSTRACT

A system includes a display monitor compatible with a video specification having a reference EOTF while exhibiting an actual EOTF that deviates from the reference EOFT. The system further includes a video source subsystem operable to determine an approximated EOTF representative of the actual EOTF based on user input received from a display of at least one test pattern to the user via the display monitor. The at least one test pattern is intended to elicit input from the user based on a visual inspection of the at least one test pattern by the user. The video source subsystem further is to convert color values of each video image of a stream of images to corresponding non-linear codewords based on the approximated EOTF, and transmit the codewords to the display monitor for display as display images representative of the video images.

21 Claims, 9 Drawing Sheets

(51) Int. Cl.
*G09G 5/37* (2006.01)
*G09G 5/10* (2006.01)

(56) References Cited

OTHER PUBLICATIONS

Wikipedia "High-dynamic-range video", https://en.wikipedia.org/wiki/High-dynamic-range_video, accessed Nov. 24, 2019, 8 pages.
Wikipedia "Rec. 2100", https://en.wikipedia.org/wiki/Rec._2100, accessed Nov. 24, 2019, 3 pages.
International Telecommunication Union "Recommendation ITU-R BT.2100-2: Image parameter values for high dynamic range television for use in production and international programme exchange", Jul. 2018, 15 pages.

* cited by examiner

PRE-DISPLAY ADAPTIVE CODEWORD MAPPING FOR DISPLAY MONITOR WITH NON-IDEAL ELECTRO-OPTICAL TRANSFER FUNCTION

BACKGROUND

Video images typically are rendered or decoded in preparation for display with their pixels having a color and luminance representation, such as one of the many red-green-blue (RGB) formats or luma-chroma formats. However, a display panel used to display these video images has a non-linear luminance output and thus relies on a color value-to-codeword mapping to accommodate this non-linear luminance output. To illustrate, assuming each R, G, and B color component of an RGB value for a pixel has eight bits (that is, a range from 0 to 255), then a change of, for example, the R value from 124 to 125 represents only a 0.39% increase in the luminance of the R value, but without some form of non-linear conversion mapping, this one-step change in the R value could result in a change in the output luminance at the display for the red component of the corresponding display pixel that could be greater than, or less than, a 0.39% increase. Accordingly, many display standards codify an ideal electro-optical transfer function (EOTF) that represents the non-linear luminance response of a display monitor compliant with that display standard. A source device driving video images to such a display monitor can employ the inverse of this ideal EOTF to map the color values of each pixel to corresponding non-linear codewords that, when converted to display light at the display device, better approximate the intended luminance for the pixel.

As the dynamic ranges of video standards increase, it is becoming more challenging for display manufacturers to fabricate display monitors that are fully compliant with such video standards. To illustrate, one high dynamic range (HDR) standard, HDR10 (e.g., as specified by the Ultra HD Forum Phase A Guidelines) specifies a dynamic range from 0 to 10,000 nits (that is, 0-10,000 candela per square meter ($cd/m^2$)), and characterizes the non-linear codeword-to-luminance response of a display monitor as one of two defined reference EOTFs: a perception quantizer (PQ) EOTF or a Hybrid Log Gamma (HLG) EOTF (both of which are defined by ITU-R BT.2100 specification). However, most consumer-grade display monitors typically are unable to replicate this entire luminance range, particularly on the bright region of this range, and thus the "ideal" EOTF for the display monitor necessarily is a clipped representation of either the reference PQ EOTF or HLG EOTF. Moreover, due to manufacturing variations, technology limitations, and other factors, many consumer-grade display monitors (and indeed, many professional-grade display monitors) do not have a codeword-to-luminance response that exactly matches the reference EOTF defined by the specification even within the luminance range that the display monitor does support; that is, the actual EOTF for the display monitor typically deviates from the reference EOTF within its actual luminance range. To illustrate, a PQ EOTF-based display monitor has, for example, a luminance range of, for example, 0.5-4,000 nits, and thus is required to clip or compress the low end and high end of its actual EOTF to the low PQ codeword corresponding to 0.5 nits and the high PQ codeword corresponding to 4,000 nits, respectively. Moreover, within the range of the 0.5 nits to 4,000 nits, the codeword-to-luminance response of this display monitor typically deviate in some manner from the reference PQ EOTF, such as by having the rate of luminance gain at a faster rate at the lower PQ codewords (that is, the "darker" or "more black" colors) than is specified by the reference PQ EOTF.

This deviation of the actual EOTF of a display monitor from the reference EOTF results in display errors, such as reduced color accuracy, and other objectional display artifacts, as well as fails to provide a display of the video image in the manner intended by the creator of the video. One conventional approach to compensating for the differences between the actual EOTF of a display monitor and the reference-derived ideal EOTF is to employ a colorimeter to measure the actual codeword-to-luminance response of the display monitor and then to have the user manually implement complex adjustments at the display monitor from on the colorimeter-based testing. However, this approach relies on relatively expensive equipment and a complex testing and calibration procedure that generally requires considerable video or graphics knowledge, and thus is impracticable for the typical consumer.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
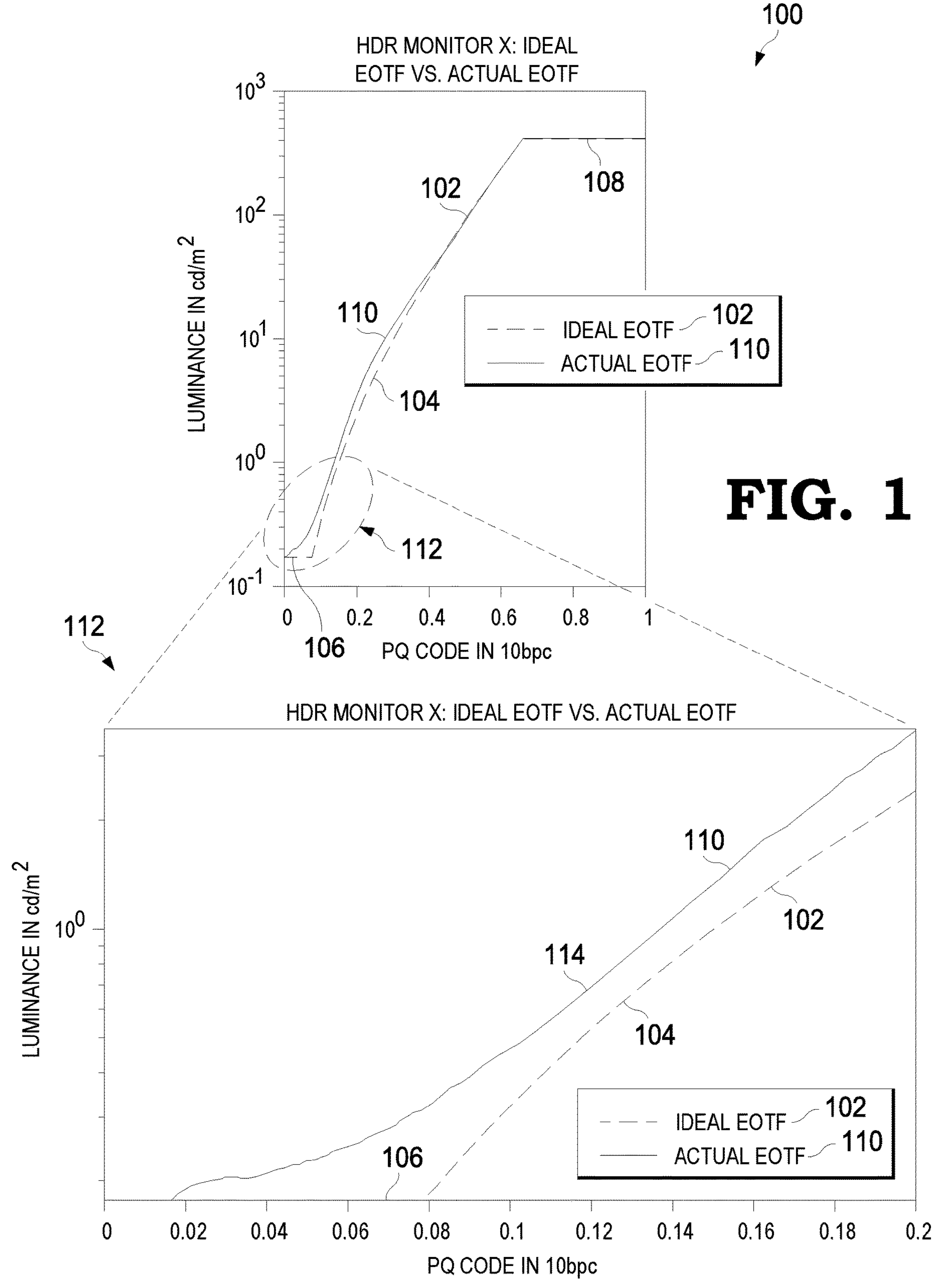
FIG. 1 is a diagram illustrating a chart showing a comparison of a plot of an ideal EOTF for a display monitor to a plot of an example actual EOTF for a display monitor in accordance with some embodiments.

Display technology, manufacturing issues, and other factors prevent a typical display monitor from exhibiting the exact same non-linear codeword-to-luminance response as the reference electro-optical transfer function (EOTF) specified in the applicable video standard, and this deviation leads to various visual aberrations in the displayed video imagery. The following describes embodiments of a video display system, and methods thereof, for adapting to non-ideal EOTF deviations in the actual EOTF exhibited by a display monitor for improved color accuracy and luminance fidelity by pre-compensating for these deviations during the process of mapping the color values of pixels of a video image to non-linear codewords that are then provided for transmission to the display monitor for conversion to display light output. In at least one embodiment, the video display system presents one or more test patterns to a user via a graphical user interface (GUI) or other software application feature displayed on the display monitor and elicits input from the user with respect to the one or more test patterns as feedback with regard to the electro-optical behavior of the display monitor. This input is provided in response to the user's visual inspection of the one or more test patterns (such as through the user's visual detection of transition points between the darkest black and the next-darkest black or the next-brightest white and the brightest white) and thus does not require use of a colorimeter or other specialized test equipment.

The video display system uses this user input, along with other parameters obtained from the display monitor, to approximate the actual EOTF of the display monitor. The video display system then determines an inverse transform representation that represents, in one embodiment, a modification or other adaptation of the ideal EOTF for the display monitor based on the approximated EOTF of the display monitor, and then uses this inverse transform representation in the linear-to-non-linear codeword mapping process. As a result, the non-linear codewords representative of a video image are pre-compensated so that when converted to display light at the display monitor in accordance with its actual EOTF, the resulting color values output by the display monitor more closely approximate the intended color values before the linear to non-linear conversion, and thus results in display of video imagery at the display monitor that has color accuracy closer to the artist's intent.

For ease of illustration, systems and techniques are described below in the example context of a video display system that operates based on the HDR10 specification and using the perception quantizer (PQ) EOTF characterized by the ITU-R BT.2100 specification as the reference EOTF and employing red-green-blue (RGB) color values in accordance with the ITU-R BT.2020 color space specification. However, these systems and techniques are not limited to this example context, but instead can be employed for video display systems utilizing any of a variety of standardized or proprietary reference EOTFs, any of a variety of standardized or proprietary color spaces, and any of a variety of standardized or proprietary video specifications. Examples of such are the HDR10 specification utilizing the Hybrid Log Gamma (HLG) EOTF (characterized by ITU-R BT.2100), the HDR10+ specification, the proprietary Dolby Vision™ video specification using the PQ EOTF as reference EOTF, a Gamma EOTF (e.g., Gamma2.2) and the like.

FIG. 1 depicts a chart 100 demonstrating a comparison of an example actual EOTF to an example ideal EOTF for a display monitor in accordance with some embodiments. As described above, HDR video specifications provide for use of a specified EOTF, such as the PQ EOTF for the HDR10 specification. This mandated EOTF is referred to herein as a "reference EOTF." Some implementations of the reference EOTF assume a luminance range beyond what is achievable by most "compliant" display monitors in practice, and thus a typical display monitor operates to clip the codewords that fall below and above the actual luminance range of the display monitor. This clipping includes shifting codewords below the codeword corresponding to the lowest luminance level up to this lowest-luminance codeword and shifting codewords above the codeword corresponding to the highest luminance level up to this highest-luminance codeword (that is, compressing codewords falling outside the achievable luminance range). Given this, the portion of the reference EOTF that falls within the achievable luminance range in addition to the clipped codeword-to-luminance relationship outside of this achievable luminance range is referred to herein as the "ideal" EOTF of the display monitor. That is, the "ideal EOTF" represents a display monitor that can fully conform to (i.e., does not deviate from) the reference EOTF within the achievable luminance range of the display monitor. For example, the PQ EOTF is based on a luminance range of 0 to 10,000 nits, but many HDR10-compliant monitors provide a more limited range, such as 0.5 to 4,000 nits. As shown by chart 100, the ideal EOTF 102 for such a display monitor would be the segment 104 of the PQ EOTF (as reference EOTF) that extends between 0.5 nits and 4,000 nits, along with a first linear clipping transform segment 106 below 0.5 nits and a second linear clipping transform segment 108 above 4,000 nits (with the first and second linear clipping transform segments 106, 108 usually being horizontal as shown). In other implementations, the reference EOTF maps to a luminance achievable by the display monitor, such as the HLG EOTF that maps to the peak display illumination. In such instances, the reference EOTF and the ideal EOTF are the same EOTF for purposes of the following description.

However, due to a number of factors, the display monitor is unlikely to exhibit the ideal EOTF for the corresponding luminance range achievable by that display monitor. Rather, the real-world EOTF exhibited by the display monitor (that is, the "actual EOTF" of the display monitor) typically deviates from the ideal EOTF in one or more ways. To illustrate, chart 100 further depicts an example actual EOTF 110 for comparison with the ideal EOTF 102. As shown by chart 100, the codeword-to-luminance relationship exhibited by the display monitor deviates from the reference PQ EOTF segment 104 of the ideal EOTF 102 such that a PQ codeword that falls in the corresponding PQ codeword range of approximately 0.02 to 0.5 (out of a total PQ codeword range of [0,1]) will result in a higher illumination level than the luminance specified by the ideal EOTF 102 in that same range. As shown in greater detail by the enlarged view of the darker side of the luminance range provided by enlarged view chart 112, the deviation of luminance output for the actual EOTF 110 from the luminance output for the ideal EOTF 102 increases as the PQ codeword decreases, with the dark-region "knee" representing the transition from the minimum luminance to luminance increasing with PQ codeword increases occurring earlier in the actual EOTF 110 at approximately 0.018, compared with the dark-region "knee" occurring in the ideal EOTF 102 at approximately 0.079.

Figure 2:
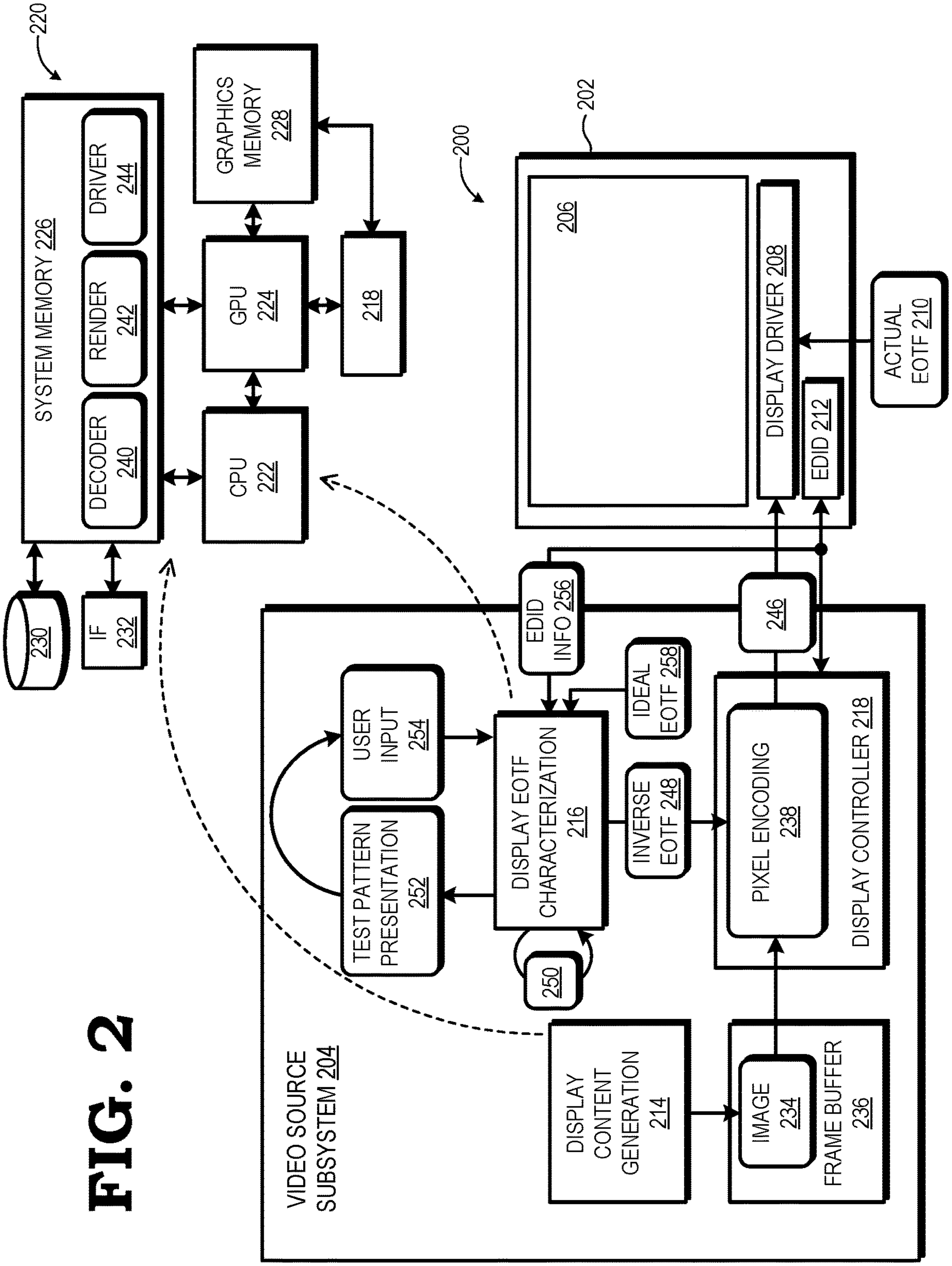
FIG. 2 is a block diagram illustrating a video display system employing adaptive codeword mapping to compensate for a non-ideal, actual EOTF of a display monitor in accordance with some embodiments.

FIG. 2 illustrates a video display system 200 employing color value encoding that pre-compensates for such deviations of the actual EOTF exhibited by a display monitor from the ideal EOTF for the actual luminance range of the display monitor. The video display system 200 is implementable in any of a variety of electronic devices, including, for example, desktop computers, laptop computers, tablet computers, compute-enabled cellular phones, televisions, optical disc players, set-top boxes, digital video streaming devices, gaming consoles, and the like. The video display system 200 includes a display monitor 202 and a video source system 204. Note that the display monitor 202 and video source system 204 can be implemented in the same device, such as in a television, compute-enabled cellular phone, tablet computer, and the like, or they can be implemented as separate devices connected via one or more wireless or wireless connections, such as a gaming console (e.g., the video source system 204) connected to a computer monitor or television (e.g., the display monitor 202) via one or more cables.

The display monitor 202 includes a display matrix 206 and a display driver 208. The display matrix 206 is composed of a two-dimensional matrix of display pixels, which are implemented as, for example, light emitting diode (LED) pixels, organic LED (OLED) pixels, liquid crystal display (LCD) pixels, plasma pixels, etc. The display driver 208 is configured to receive, for each video image to be displayed, a set of codewords (e.g., PQ codewords) representative of the pixels the video image and to individually control the light output of the various display pixels of the display matrix 206 using voltage or current signaling so that the resulting display light is perceived by a user as a representation of the video image. As noted above, this conversion of codeword to a particular luminance level for the color values of the corresponding display pixel is represented by an actual EOTF 210 (e.g., actual EOTF 110, FIG. 1) of the display monitor 202 as a result of the particular operation of the display driver 208, the display matrix 206, and other components of the display monitor 202. The display monitor 202, in some embodiments, further includes an Extended Display Identification Data (EDID) module 212 that operates to provide various EDID information or other capability information to the video source system 204, with this information describing various capabilities of the display monitor 202, including, for example, the PQ codeword that corresponds to the black level of the display monitor 202 and the PQ codeword that corresponds to the peak white level of the display monitor 202.

In one embodiment, the video source system 204 includes a display content generation subsystem 214, a display EOTF characterization module 216, and a display controller 218. These components can be implemented in hardcoded logic (e.g., an application specific integrated circuit, fixed function hardware, or certain circuitry of one or more processors), programmable logic (e.g., a programmable logic device), in one or more processors executing instructions of one or more software programs that manipulate the one or more processors to implement the functionality described herein, or a combination thereof. For example, in one embodiment the video source system 204 is implemented at least in part by a processing system 220 that includes one or more processors, such as a central processing unit (CPU) 222 and a graphics processing unit (GPU) 224, a system memory 226, a graphics memory 228 (which can be part of, or separate from, the system memory 226), one or more mass storage devices 230, and one or more peripherals, such as a wireless or wired network interface 232, as well as the display controller 218. In this case, some or all of the functionality of the display content generation module 214, display EOTF characterization module 216, and certain functions of the display controller 218 can be implemented in hardcoded or programmable hardware of one or both of the CPU 222 or GPU 224, in execution of software programs stored in the system memory 226 by one or both of the CPU 222 or the GPU 224, or a combination thereof, as described in greater detail below.

Figure 3:
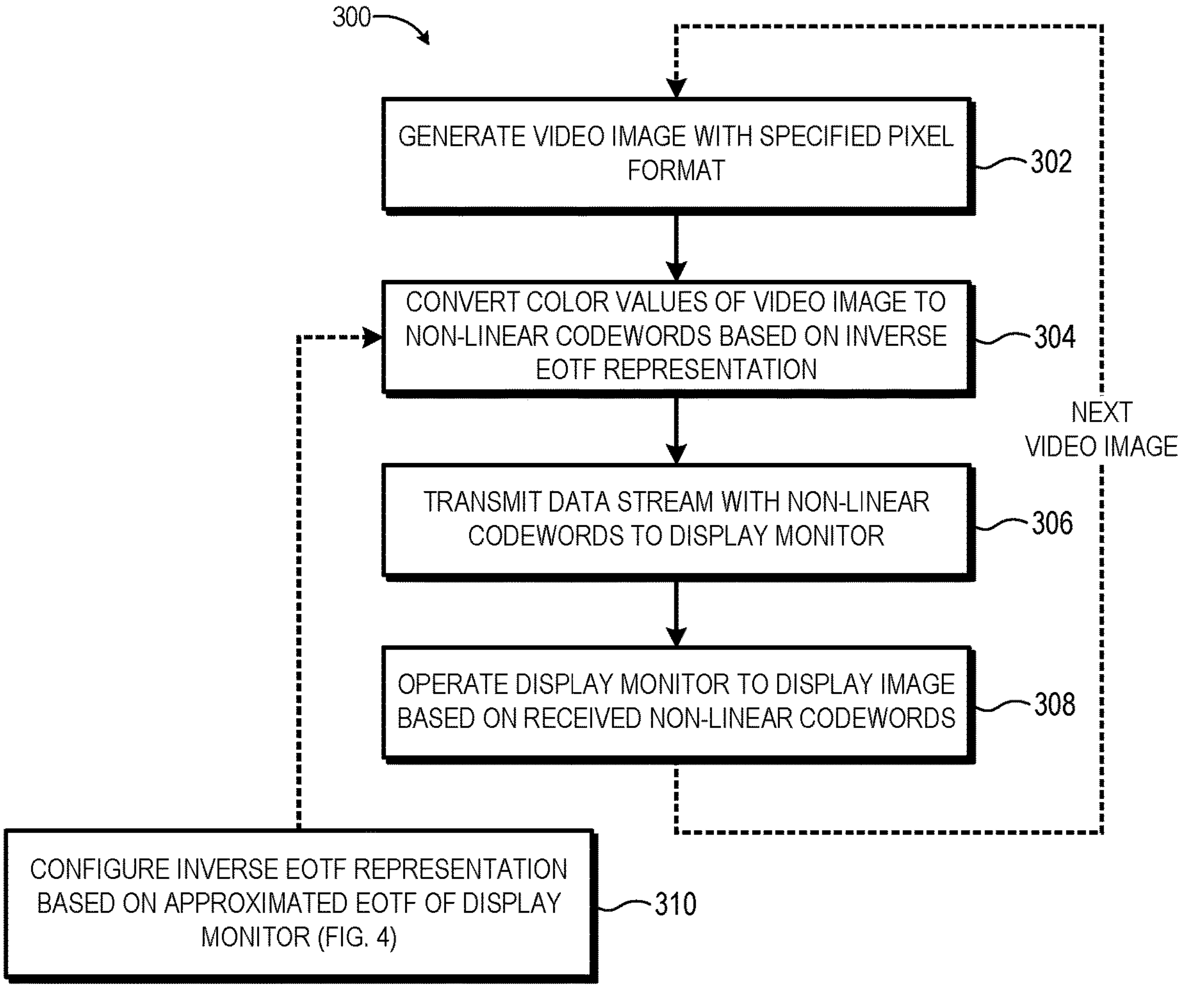
FIG. 3 is a flow diagram illustrating a method of operation of the video display system of FIG. 2 in accordance with some embodiments.

As a general operational overview, the video source system 204 operates to generate a sequence of video images representing a display stream, convert the color values of pixels of each video image to a corresponding set of non-linear codewords (e.g., PQ codewords) and to transmit the set of codewords to the display monitor 202 for display as a display image representative of the generated video image. Referring now to FIG. 3, an example method 300 illustrating this operation of the video source system 204 and the display monitor 202 of FIG. 2 is described in accordance with at least one embodiment. At block 302, the display content generation subsystem 214 generates a video image 234 (FIG. 2) of a sequence of video images representing a display stream and temporarily buffers the video image 234 in a frame buffer 236 (FIG. 2) as it is generated. The frame buffer 236 is implemented in, for example, the graphics memory 228 or the system memory 226.

The generation of the video image 234 includes, for example, execution of a decoder application 240 (FIG. 2) to decoded previously-encoded video data obtained from the mass-storage device 230 or from a server or other remote source via a network accessed via the network interface 232. Alternatively, generation of the video image 234 includes, for example, rendering a computer-graphics-based video image using the GPU 224 as part of execution of, for example, a computer game application or other render-based software application 242 (FIG. 2). Still further, generation of the video image 234 can include a combination of decoding previously-decoded video data and rendering of graphics, such as by decoding encoded video data to generate a base video image, and then rendering an overlay that is combined with the base video image to generate the video image 234.

Typically, the pixel data of the video image 234 is formatted in accordance with a specified pixel format, which can be a linear pixel format, such as the Academy Color Encoding System (ACES) standard, or a non-linear pixel format, such as standard RGB (sRGB)(described by the IEC 61966-2-1 specification) or a YCbCr format or other luma-chroma format. However, the display driver 208 of the display monitor 202 operates on the basis of a non-linear EOTF codeword format, such as a PQ codeword format, and thus at block 304 the display controller 218 operates to perform a linear-to-non-linear codeword mapping process 238 (FIG. 2) to convert each color value of a pixel of the video image 234 to a corresponding non-linear codeword compatible for use by the display monitor 202. The pixel-codeword mapping process 238 is implemented by hard-coded or programmable logic, by a software driver 244 (e.g., a display driver) executed by one or both of the CPU 222 or GPU 224, or a combination thereof.

At block 306, the display controller 218 transmits a data stream 246 containing these converted codewords and associated metadata and control signaling to the display monitor 202 using any of a variety of signaling formats, such as a High-Definition Multimedia Interface (HMDI) format, a DisplayPort format, a Universal Serial Bus-C (USB-C) format, and the like. At block 308, the display driver 208 buffers the received codewords and associated signaling and drives the display matrix 206 based on the codewords so as to emit display light representative of the visual content of the video image 234 and on the basis of the actual EOTF of the display monitor 202.

In at least one embodiment, the linear-to-non-linear mapping process 238 performed at block 304 employs an inverse EOTF ($EOTF^{-1}$) representation 248 to map each color value of a pixel of the video image 234 to a corresponding codeword (e.g., a PQ codeword when using a PQ EOTF) that is used by the display driver 208 to control the illumination of a corresponding display pixel of the display matrix 206. In a conventional system, the inverse EOTF uses for this mapping is based on an inversed transform of either the reference EOTF of the video specification to which the display monitor complies or an ideal EOTF 258 as modified from the reference EOTF based on the limited luminance range of the display monitor. However, as explained above, the display monitor 202, as is typical among display monitors, exhibits an actual EOTF 210 that deviates from the ideal EOTF 258 in a manner that can negatively impact color accuracy and contrast and introduce other visual aberrations if the display monitor 202 were to display a video image mapped to codewords based on an inverse EOTF that incorrectly assumes that the display monitor 202 provides an ideal EOTF.

Accordingly, as represented by block 310, in at least one embodiment the display EOTF characterization module 216 (which is implemented at least in part, for example, through execution of software driver 244) operates to estimate or otherwise approximate the actual EOTF 210 of the display monitor 202, and from the resulting approximated EOTF 250, generate or otherwise configure the inverse EOTF representation 248 to provide color value-to-codeword mapping based on the approximated EOTF 250, rather than based on the reference EOTF or the ideal EOTF 258 for a display monitor with the luminance range of the display monitor 202. In this manner, by using the inverse EOTF representation 248 configured to reflect the actual EOTF 210 of the display monitor 202 rather than the ideal EOTF 258 during the linear-to-non-linear mapping process 238, the resulting codewords are, in effect, encoded to pre-compensate for the deviation in luminance response between the actual EOTF 210 of the display monitor 202 and the ideal EOTF, and thus resulting in the display image output by the display monitor 202 on the basis of these pre-compensated codewords to more accurately reflect the color value-to-luminance response assumed by the content creator. The calibration process of EOTF approximation and inverse EOTF representation generation as represented by block 310 is triggered by, for example, the connection of the display monitor 202 to the video source system 204 for the first time, after the lapse of a period of time since the last calibration, through user activation of the calibration process through a settings graphical user interface (GUI), and the like.

As described in greater detail below, in some embodiments, the display EOTF characterization module 216 determines the approximated EOTF 250 representative of the actual EOTF 210 based on user-facilitated testing of the display monitor 202 through a test pattern presentation process 252 in which one or more test patterns are displayed to the user via a GUI at the display monitor 202 and the user visually inspects the one or more displayed test patterns and provides user input 254 based on this visual inspection through a mouse, keyboard, touchpad, touchscreen or other user input/output (I/O) device and the GUI, with the user input 254 thus reflecting certain display performance characteristics of the display monitor 202, which are used by the display EOTF characterization module 216 in combination with other capability information of the display monitor 202 in EDID information 256 provided by the EDID module 212. The user-testing-facilitated actual EOTF approximation process and inverse EOTF generation process are described in greater detail with reference to FIGS. 4-7 below.

Figure 4:
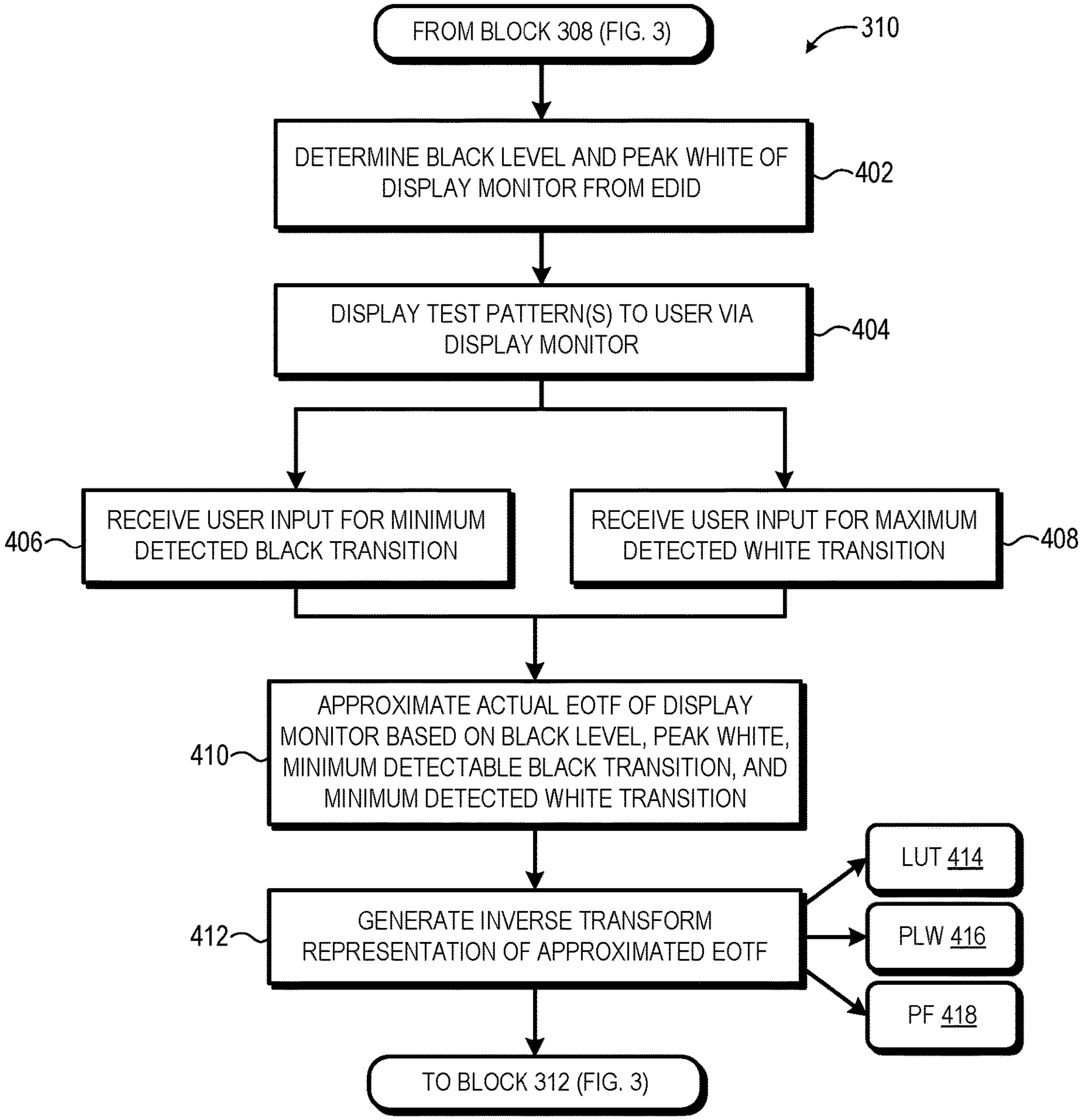
FIG. 4 is a flow diagram illustrating a method for approximating an actual EOTF of a display monitor and determining an inverse transform representation of the approximated EOTF based on user-facilitated testing via the display monitor in accordance with some embodiments.

FIG. 4 illustrates the calibration process of EOTF approximation and inverse EOTF representation generation of block 310 of FIG. 3 in greater detail in accordance with some embodiments. Following an event that triggers the calibration process, such as connection of the display monitor 202 to the video source system 204, at block 402 the display controller 218 obtains the EDID information 256 from the EDID module 212 of the display monitor 202 and passes the EDID information 256 to the display EOTF characterization module 216. The display EOTF characterization module 216 parses the EDID information 256 to obtain the bit depth of the display monitor 202 and, if available, one or both of an indication of the black level of the monitor and an indication of the peak white of the display monitor.

At block 404, the display EOTF characterization module 212 coordinates with the software driver 244 to display a GUI containing one or more predetermined test patterns to the user via the display monitor 202. In one embodiment, one of the displayed test patterns is a dark-region test pattern that serves to obtain input from the user that indicates a codeword corresponding to a transition point at which the user identifies a darkest detectable change in luminance at the dark region of the luminance range of the display monitor, which represents a transition point at which the user is able to visually detect a transition from a darkest luminance to a next-darkest luminance of the display monitor; that is, the point at which display output based on a lower codeword does not result in any visibly darker color on the display monitor 202. Another one of the displayed test patterns includes, indicates a codeword corresponding to a transition point at which the user identifies a brightest detectable change in luminance at the bright region of the luminance range of the display monitor, which represents a transition point at which the user is able to visually detect a transition from a next-brightest luminance to a brightest luminance of the display monitor; that is, the point at which the display output saturates at its absolute pure white and any higher codeword does not result in any visible brighter color on the display monitor 202. The user interacts with the test patterns of the displayed GUI to provide user input indicating, for example, where in the dark-region test pattern the user has detected the transition from the darkest black to the next darkest black (hereinafter, the "minimum detected black transition")(block 406) and where in the bright-region test pattern the user has detected the transition from the second-brightest white to pure white (hereinafter, the "maximum detected white transition")(block 408).

Figure 5:
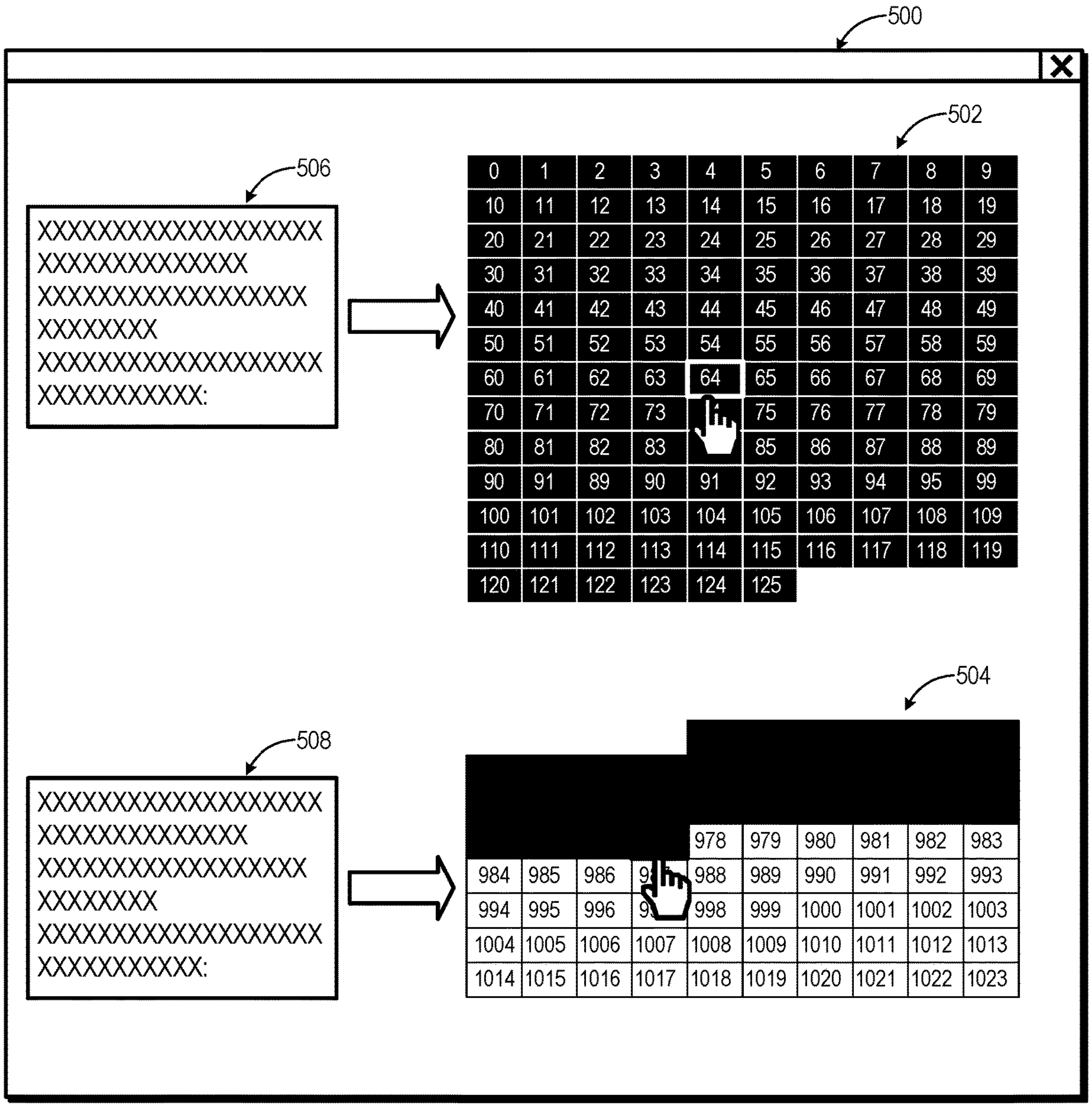
FIG. 5 is a diagram illustrating an example graphical user interface (GUI) provided by the video processing system of FIG. 1 for presenting test patterns to a user and eliciting user input based on a visual inspection of the test patterns in accordance with some embodiments.

Turning briefly to FIG. 5, an example GUI 500 for user-facilitated testing is illustrated in accordance with some embodiments. In this example, the GUI 500 includes a dark-region test pattern 502 and a bright-region test pattern 504. In this example, the dark-region test pattern 502 includes an [M×N] array of display boxes, with each display box configured to output display light in accordance with a corresponding color [Y Y] in PQ/BT.2020 color space format around an estimated black level range for the display monitor, with Y increasing by 1 for each successive box across each row and column. In this example, M=12, N=10 and Y=[0 . . . 125] in 10bpc codewords. That is, each display box represents a corresponding codeword that increases by one for each successive display box within a row of the array, and by one from the last display box in the previous row to the first display box in the next row, and thus represents a black level span from 0 to approximately 0.5 nits. Based on instructions 506 displayed to the user, the user searches for the first display box that appears as a slightly lighter black level than all of the display boxes of the same uniform black preceding it in the array, and then selects this display box using any of a variety of I/O devices, such as via the cursor associated with a mouse or touchpad, via a touchscreen, via a keyboard, and the like. Note that while the value of Y for each display box is depicted in the test pattern 502 in FIG. 5 for purposes of illustration, the display boxes would not illustrate a corresponding value so as to avoid interfering with the user's detection of the first shade transition. For purposes of this example and examples described below, it is assumed that the user detects the first transition from the darkest display box to a slightly less dark display box in the test pattern 502 at row 7, column 5 and associated with a Y value of 64. As a result, the user input indicates that the minimum detected black transition corresponds to codeword 64 in the depicted example.

Similarly, the bright-region test pattern 504 includes an [J×K] array of display boxes, with each display box configured to output display light in accordance with a corresponding color in PQ/BT.2020 color space format around an expected pure white level for the display monitor 202, with Y increasing by 1 for each successive box across each row and column. In this example, J=8, K=10 and Y=[948 . . . 1023] in 10bpc codewords. Based on instructions 508 displayed to the user, the user searches for the last display box in the array that appears to be a slightly darker white than all of the display boxes of the same uniform brightness following it in the array, and then selects this display box using an I/O device. Again, while the value of Y for each display box is depicted in the test pattern 504 in FIG. 5 for purposes of illustration, the display boxes would not illustrate a corresponding value so as to avoid interfering with the user's detection of the first shade transition. For purposes of this example and examples described below, it is assumed that the user detects the last transition from the second brightest display box to the brightest display box in the test pattern 504 at row 4, column 4 and associated with a Y value of 977. As a result, the user input indicates that the maximum detected white transition corresponds to codeword 977 in the illustrated example.

Returning to FIG. 4, after receiving the user input identifying the minimum detected black transition and the maximum detected white transition, at block 410 the display EOTF characterization module 216 approximates or otherwise estimates the actual EOTF 210 of the display monitor 202 using the black level and peak white parameters determined at block 402 and the minimum detectable black transition and maximum detectable white transition parameters determined at blocks 406 and 408, respectively, to generate the approximated EOTF 250. This approximation process can be implemented in any of a variety of ways. Generally, noting that the black level and peak white parameters specify the clipping levels of the actual EOTF 210, the minimum detectable black transition approximates the "knee" in the dark-region region of the actual EOTF 210, and the maximum detectable white transition approximates the "knee" in the bright-region region of the actual EOTF 210, any of a variety of curve-fitting algorithms or other interpolation algorithms can be utilized to fit a spline or other curve to EOTF points represented by some or all of these parameters. An example process for determining the approximated EOTF 250 based on fitting of a cubic Hermite spline is described below with reference to FIGS. 6-9.

With the approximated EOTF 250 determined, at block 412 the display EOTF characterization module 216 operates to generate the inverse EOTF representation 248 based on the approximated EOTF 250. Any of a variety of algebraic or computational techniques can be employed to find the inverse function ($EOTF^{-1}$) of the approximated EOTF 250 To illustrate, assume the approximated EOTF 250 is represented by L, with L=EOTF(C), with C representing the non-linear code and L representing luminance, with C=[0:0123] and L=[L0, L1, . . . , L1023] (assuming 10-bit representations). In this example, the inverse of the approximated EOTF 250 is calculated using linear interpolation using C and L (that is, Cn=interpolation_function(L, C, Ln)), where interpolation_function can represent any of a variety of interpolation algorithms, such as a bi-linear interpolation algorithm.

The display EOTF characterization module 216 then uses the determined inverse EOTF to generate or configure the inverse EOTF representation 248 used by the linear-to-non-linear mapping process 238 to convert color values of pixels to their corresponding codewords (e.g., convert linear RGB color values to PQ\BT.2020 codewords), where the inverse EOTF representation 248 operates to take a color value as an input and provide a corresponding output codeword (e.g., a PQ/BT.2020 codeword) that is pre-compensated for deviation of the actual EOTF 210 from the ideal EOTF. As such, the inverse EOTF representation 248 can be implemented in any of a variety of structures representative of transform functions, such as configuration of the values of one or more look-up tables (LUT 414), the configuration of programmable logic or other hardware or a software routine executed by the CPU 222 or GPU 224 that provides a piecewise linear (PWL) representation 416 of the inverse EOTF, the configuration of programmable logic or other hardware or a software routine executed by the CPU 222 or GPU 224 that provides a polynomial function (PF) representation 418 of the inverse EOTF, and the like.

As the method described above illustrates, rather than encode the pixels of video images on the assumption of an ideal EOTF and thus risk color accuracy and contrast degradation when the actual EOTF deviates from the ideal EOTF, the video source system 204 instead configures the pixel-codeword mapping process to reflect the actual EOTF, or an estimation or other approximation thereof. However, unlike conventional approaches that require colorimeters and other expensive test equipment as well as a high level of proficiency in conducting the calibration and configuring the system on the part of the user, the described technique requires no additional equipment other than the display monitor already on hand and does not require any complex action from the user, but rather the straightforward task of a brief visual inspection of relatively simple test patterns and straightforward collection input from the user on the basis of this visual inspection via the GUI 500.

Figure 6:
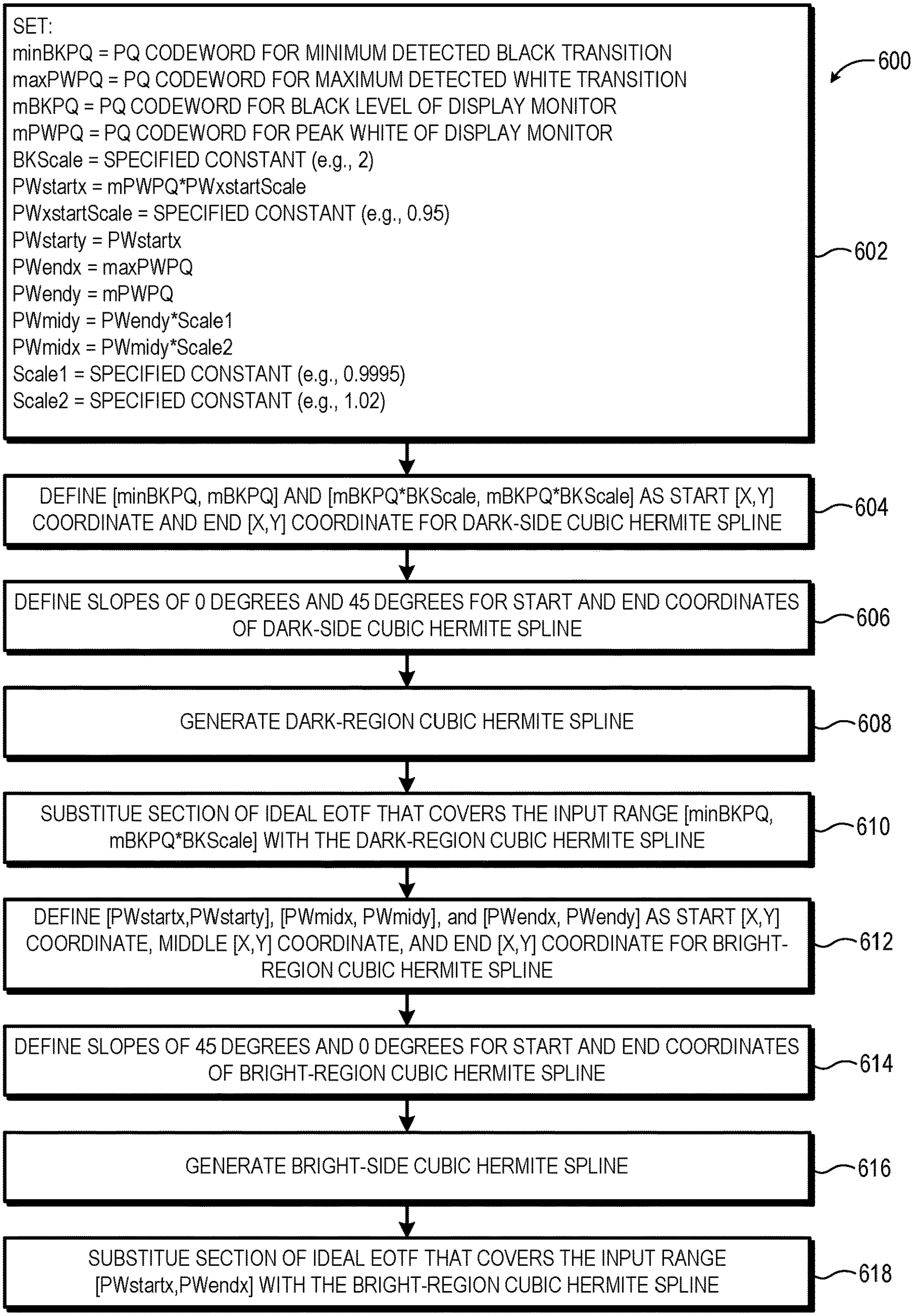
FIG. 6 is a flow diagram illustrating a method for determining an approximation of an actual EOTF of a display monitor in accordance with some embodiments.

FIGS. 6-9 illustrate an example implementation technique for the actual EOTF approximation process of block 410 of FIG. 4 in accordance with some embodiments. In this technique, the actual EOTF is approximated through the fitting of a cubic Hermite spline (also known as a cubic Hermite interpolator) to points based on the EDID display characteristic parameters and user-indicated dark-region and bright-region knee parameters obtained as described above with reference to blocks 402 and 404 of FIG. 4. Turning to FIG. 6, a flowchart of a method 600 representing this process is illustrated. At block 602, initial parameters of the algorithm are set as follows: the parameter minBKPQ is set to the PQ codeword for the minimum detected black transition (e.g., 64 in the example of FIG. 5), maxPWPQ is set to the PQ codeword corresponding the maximum detected white transition (e.g., 1023 in the example of FIG. 5), mBKPQ is set to the PQ codeword corresponding to the black level determined from the EDID information 256, mPWPQ is the PQ codeword set for the peak white capability determined from the EDID information 256, and BKScale is a constant that can be determined empirically, through simulation or modeling, and in some embodiments is based on the particular reference EOTF used. For purposes of the following, assume BKScale=2 for the PQ EOTF as the reference EOTF. Further, PWstartx is set to the product of mPWPQ and PWxstartScale, which is a specified constant determined through experimentation, simulation, or modeling. For the following, assume PWxstartScale=0.95. The parameter PWstarty is set to PWstartx, PWendx is set to maxPWPQ, PWendy is set to mPWPQ, PWmidy is set to PWendy*Scale1 and PWmidx is set to PWmidx*Scale2, where Scale1 and Scale2 are specified constants determined empirically or otherwise. For the following, assume Scale1=0.9995 and Scale2=1.02.

In this approximation technique, the ideal EOTF for the luminance range of the monitor is modified by replacing the dark-region portion of the ideal EOTF that covers the input range [minBKPQ, mBKPQ*BKScale] with a dark-region cubic Hermite spline (determined as described below) and by replacing the bright-region portion of the ideal EOTF that covers the input range [PWstartx, PWendx] with a separate bright-region cubic Hermite spline (determined as described below). Accordingly, at block 604 the [X,Y] points [minBKPQ, mBKPQ] and [mBKPQ*BKScale, mBKPQ*BKScale] are specified as the start coordinate and end coordinate, respectively, for the dark-region cubic Hermite spline and at block 606 the start coordinate and end coordinate are specified to have slopes of, for example, 0 and 45 degrees, respectively. Accordingly, at block 608 a dark-region cubic Hermite spline is generated using the defined start coordinate, end coordinate, start slope and end slope. At block 610, the ideal EOTF 258 for the display monitor 202 is modified by replacing the section of the ideal EOTF 258 that covers the input range [minBKPQ, mBKPQ*BKScale] with the dark-region cubic Hermite spline generated at block 608 to generate a partially-complete approximated EOTF.

Turning to the bright region of the EOTF, at block 612 the [X,Y] coordinates [PWstartx, PWstarty], [PWmidx, PWmidy], and [PWendx, PWendy] are set as the start coordinate, middle coordinate, and end coordinate, respectively, for the bright-region cubic Hermite spline being generated. At block 614, the start coordinate and end coordinate are specified to have slopes of, for example, 45 and 0 degrees, respectively. Accordingly, at block 616 a bright-region cubic Hermite spline is generated using the defined start coordinate, middle coordinate, end coordinate, start slope and end slope. At block 618, the partially-completed EOTF for the display monitor 202 is modified by replacing the section of the remaining portion of the ideal EOTF that covers the input range [PWstartx, PWendx] with the bright-region cubic Hermite spline generated at block 616 to complete the approximated EOTF that represents an estimation or other approximation of the display monitor's actual EOTF.

Figure 7:
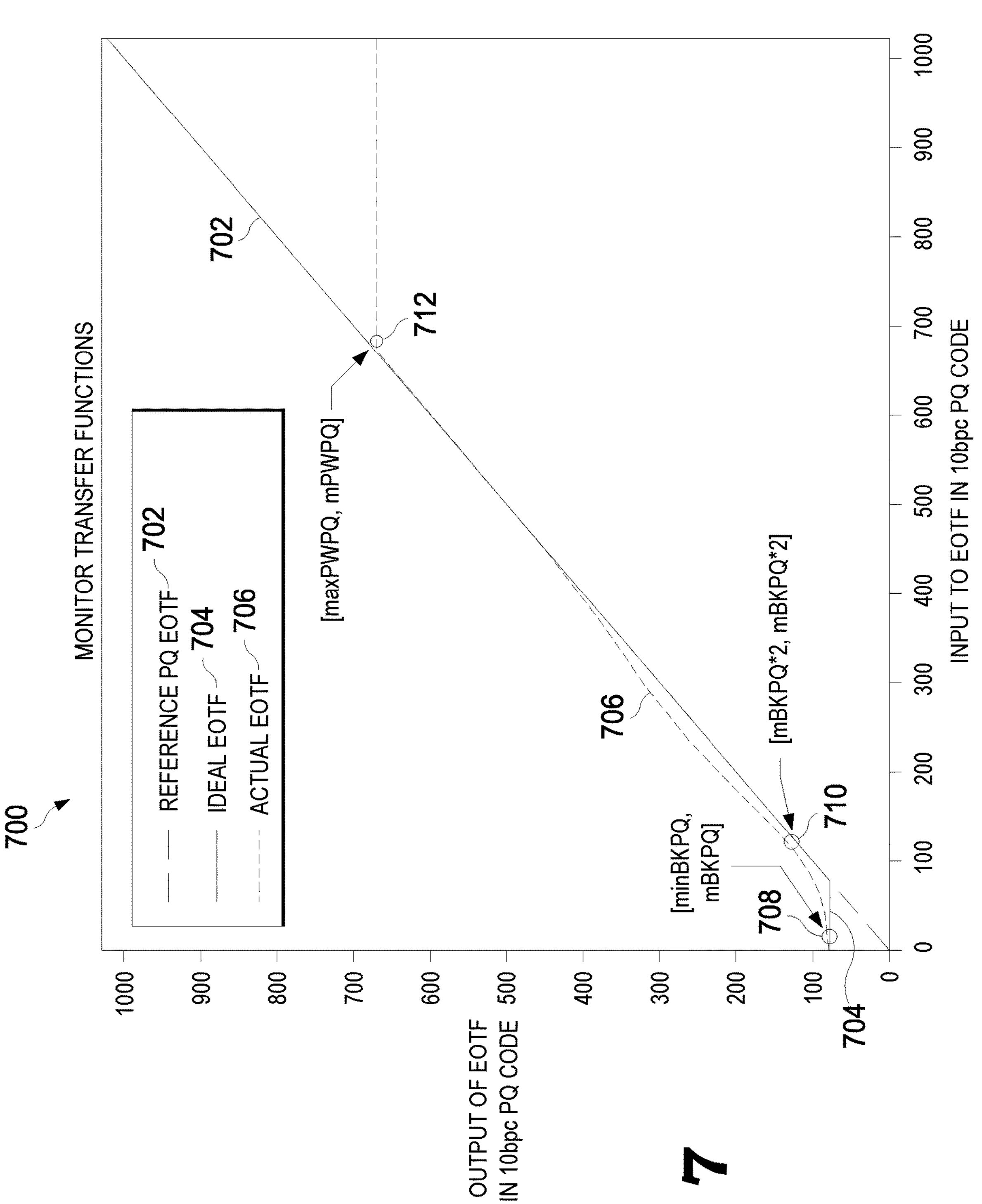
FIG. 7 is a diagram illustrating a chart showing a comparison of a reference monitor transfer function, an ideal monitor transfer function, and an actual monitor transfer function in accordance with some embodiments.

Chart 700 of FIG. 7 illustrates certain of these parameters with respect to a dark-region monitor transfer function relative to the reference PQ EOTF (unity plot 702), with the ideal EOTF (plot 704), and the actual EOTF (plot 706). Point 708 represents the start coordinate [minBKPQ, mBKPQ] (in [X,Y] coordinates), point 710 represents the coordinate [minBKPQ*BKScale, minBKPQ*BKScale], and point 712 represents the coordinate [maxPWPQ, mPWPQ].

Figure 8:
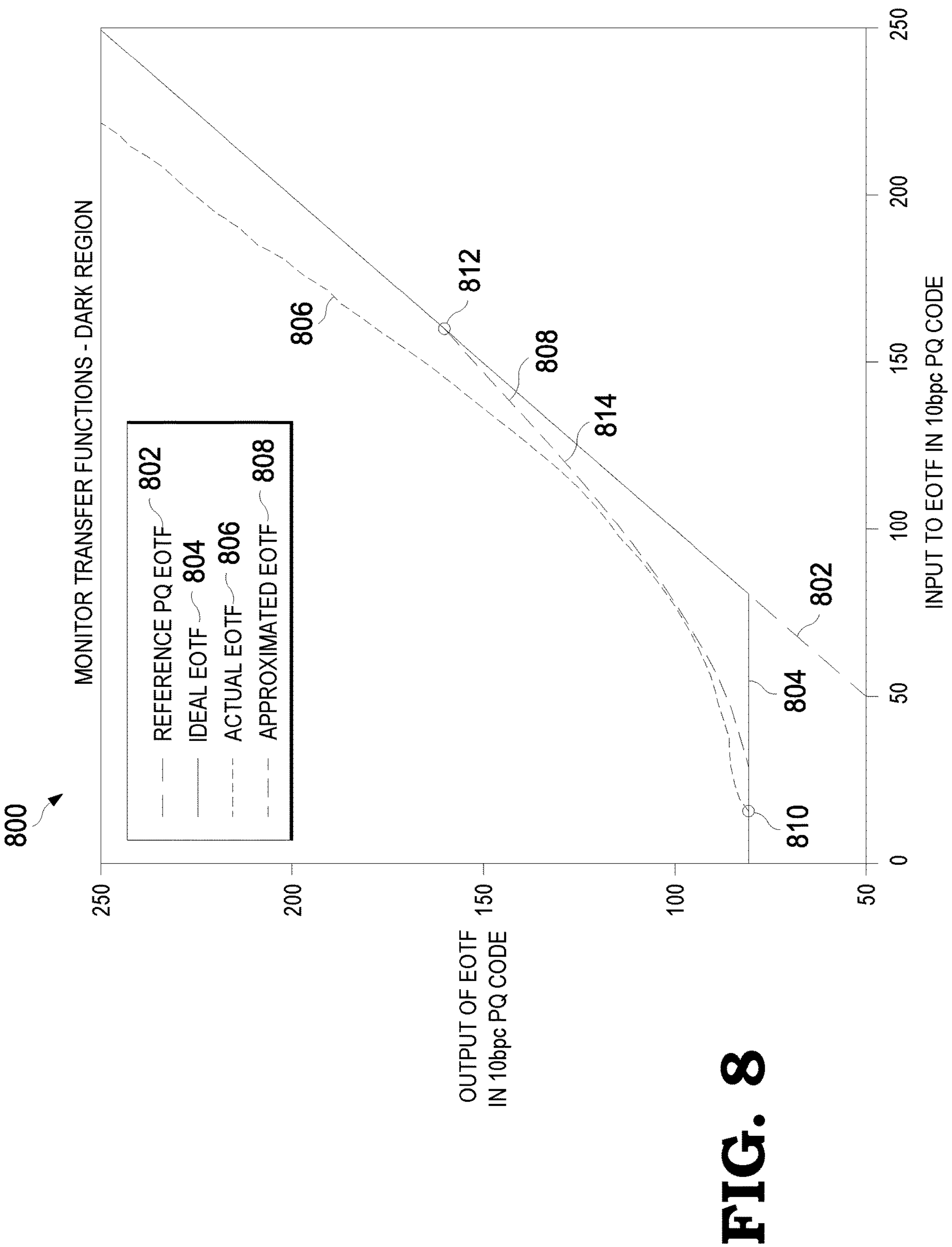
FIG. 8 is a diagram illustrating a chart showing a dark-side region of the monitor transfer function of FIG. 7 with a comparison of corresponding portions of an ideal EOTF, an actual EOTF, and an approximated EOTF in accordance with some embodiments.
Figure 9:
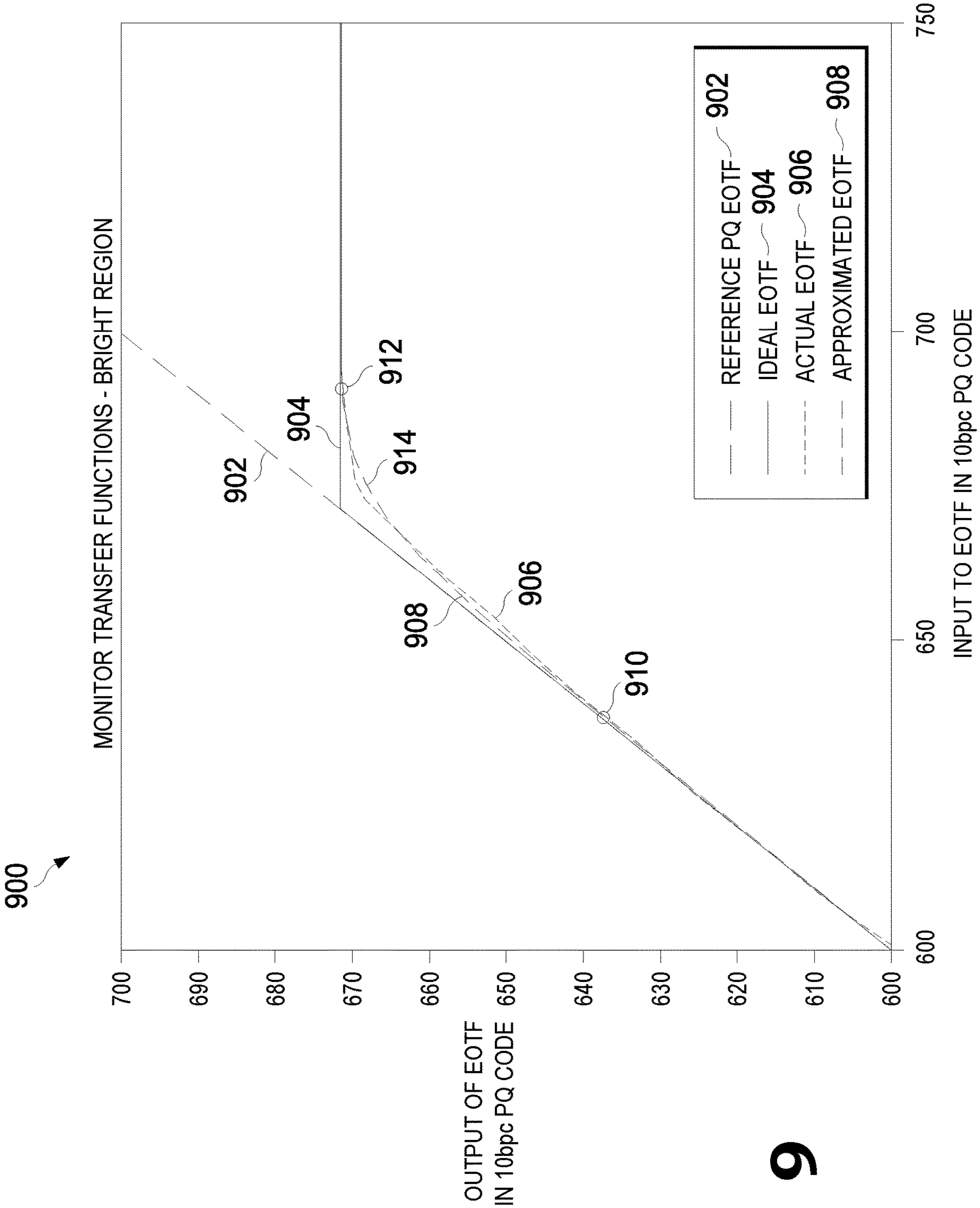
FIG. 9 is a diagram illustrating a chart showing a bright-side region of the monitor transfer function of FIG. 7 with a comparison of corresponding portions of an ideal EOTF, an actual EOTF, and an approximated EOTF in accordance with some embodiments.

Chart 800 of FIG. 8 illustrates an enlarged view of a dark-region monitor transfer function, showing the reference PQ EOTF (unity plot 802), the ideal EOTF (plot 804), the actual EOTF (plot 806), and the approximated EOTF (plot 808) in the dark region. As shown in chart 800, the approximated EOTF is created in part by replacing the portion of the ideal EOTF between the start point 810 and end point 812 (corresponding to [minBKPQ, mBKPQ] and [mBKPQ*BKScale, mBKPQ*BKScale], respectively) with a dark-region cubic Hermite spline 814 generated as described above. Similarly, chart 900 of FIG. 9 illustrates an enlarged view of a bright-region monitor transfer function, showing the reference PQ EOTF (unity plot 902), the ideal EOTF (plot 904), the actual EOTF (plot 906), and the approximated EOTF (plot 908) in the bright region. As shown in chart 900, the approximated EOTF is created in part by replacing the portion of the ideal EOTF between the start point 910 and end point 912 (corresponding to [PWstartx, PWstarty] and [PWendx, PWendy], respectively) with a bright-region cubic Hermite spline 914 generated as described above. As for the remainder of the approximated EOTF outside of the region between points 810 and 812 (FIG. 8) and the region between points 910 and 912, these remaining portions are maintained as the same as the ideal EOTF for the same ranges. That is, the portion of the approximated EOTF between the dark-region cubic Hermite spline 814 terminated at point 812 and the bright-region cubic Hermite spline 914 starting at point 910 is, in one embodiment, composed of a section of the ideal EOTF that covers the region between point 812 and point 910.

In some embodiments, the apparatuses and techniques described above are implemented in a system including one or more integrated circuit (IC) devices (also referred to as integrated circuit packages or microchips), such as some or all of the components of the video display system 200 described above with reference to FIGS. 2-6. Electronic design automation (EDA) and computer-aided design (CAD) software tools often are used in the design and fabrication of these IC devices. These design tools typically are represented as one or more software programs. The one or more software programs include code executable by a computer system to manipulate the computer system to operate on code representative of circuitry of one or more IC devices to perform at least a portion of a process to design or adapt a manufacturing system to fabricate the circuitry. This code includes instructions, data, or a combination of instructions and data. The software instructions representing a design tool or fabrication tool typically are stored in a computer-readable storage medium accessible to the computing system. Likewise, the code representative of one or more phases of the design or fabrication of an IC device is either stored in and accessed from the same computer-readable storage medium or a different computer-readable storage medium.

A computer-readable storage medium includes any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid state storage devices such as Flash memory, a cache, random access memory (RAM) or other non-volatile memory device or devices, and the like. The executable instructions stored on the non-transitory computer-readable storage medium can be in source code, assembly language code, object code, or other instruction format that is interpreted or otherwise executable by one or more processors.

In accordance with one aspect, a system includes a display electro-optical transfer function (EOTF) characterization module configured to provide a graphical user interface (GUI) for display to a user via a display monitor, the GUI including presentation of a set of one or more test patterns, receive user input regarding the set of one or more test patterns via the GUI, determine an approximated EOTF that is representative of an actual EOTF exhibited by the display monitor based on the user input, and determine an inverse EOTF representation of the approximated EOTF. The system further includes a display controller couplable to the display monitor and configured to, for each video image of a stream of video images, convert color values representative of the video image to corresponding codewords based on the inverse EOTF representation and provide the codewords for transmission to the display monitor. In some aspects, the set of one or more test patterns includes at least one of: a first test pattern used to identify a first codeword based on the user's visual detection of a darkest detectable change in luminance in the displayed first test pattern; or a second test pattern used to identify a second codeword based on the user's visual detection of a brightest detectable change in luminance in the displayed second test pattern; and the display EOTF characterization module is configured to determine the approximated EOTF based on at least one of the first codeword or the second codeword. In some aspects, the first test pattern includes an array of display boxes, each display box representing a corresponding codeword that increases by one for each successive display box within a row of the array. In some aspects, the display EOTF characterization module is further configured to identify at least one of a black level of the display monitor or a peak white of the display monitor based on capability information received from the display monitor, and the display EOTF characterization module is configured to determine the approximated EOTF further based on at least one of the identified black level or the identified peak white of the display monitor. In some aspects, the display EOTF characterization module is configured to determine the approximated EOTF by: determining a dark-region spline based on the black level and the first codeword; determining a bright-region spline based on the peak white and the second codeword; and generating the approximated EOTF with the dark-region spline in a corresponding dark region of the approximated EOTF, with the bright-region spline in a corresponding bright region of the approximated EOTF, and with a corresponding portion of an ideal EOTF connecting the dark-region spline and the bright-region spline, wherein the ideal EOTF is a representation of a reference EOTF for a luminance range of the display monitor. The dark-region spline and the bright-region spline, in some aspects, are cubic Hermite splines. In some aspects, the inverse EOTF representation is implemented as at least one of: one or more lookup tables (LUTs); hardcoded or programmable logic implementing a piecewise linear function; executable instructions implementing a piecewise linear function; hardcoded or programmable logic implementing a polynomial function; or executable instructions implementing a polynomial function. The system further can include the display monitor.

In accordance with another aspect, a system includes a display monitor compatible with a video specification having a reference electro-optical transfer function (EOTF) while exhibiting an actual EOTF that deviates from a reference EOFT. The system further includes a video source subsystem configured to: determine an approximated EOTF representative of the actual EOTF based on user input received from a display of at least one test pattern to a user via the display monitor, the at least one test pattern to elicit input from the user based on a visual inspection of the at least one test pattern by the user; convert color values of each video image of a stream of video images to corresponding non-linear codewords based on the approximated EOTF; and transmit the codewords to the display monitor for display as display images representative of the video images. In some aspects, the user input indicates at least one of a first transition point at which the user is able to visually detect a transition from a darkest luminance to a next-darkest luminance of the display monitor or a second transition point at which the user is able to visually detect a transition from a next-brightest luminance to a brightest luminance of the display monitor. In some aspects, the video source subsystem further is configured to determine an inverse EOTF representation of the approximated EOTF, and the video source subsystem is configured to convert the color values to corresponding non-linear codewords using the inverse EOTF representation. In some aspects, the inverse EOTF representation is implemented as at least one of: one or more lookup tables (LUTs); hardcoded or programmable logic implementing a piecewise linear function; executable instructions implementing a piecewise linear function; hardcoded or programmable logic implementing a polynomial function; or executable instructions implementing a polynomial function. In some aspects, the video source subsystem is configured to generate the stream of video images via at least one of: decoding previously-encoded video data; or rendering of display content.

In yet other aspects, a method includes providing, from a processing system, a graphical user interface (GUI) for display to a user via a display monitor, the GUI including presentation of a set of one or more test patterns. The method further includes receiving, at the processing system, user input based on a visual inspection of the one or more test patterns by the user, and determining, at the processing system, an approximated electro-optical transfer function (EOTF) based on the user input, the approximated EOTF representative of an actual EOTF exhibited by the display monitor. The method also includes, for each video image of a stream of video images, converting, at the processing system, color values of the video image to corresponding codewords based on the approximated EOTF, and providing the codewords for transmission from the processing system to the display monitor. In some aspects, the set of one or more test patterns includes at least one of a first test pattern used to identify a first codeword based on the user's visual detection of a darkest detectable change in luminance in the displayed first test pattern or a second test pattern used to identify second codeword based on the user's visual detection of a brightest detectable change in luminance in the displayed second test pattern, and wherein determining the approximated EOTF comprises determining the approximated EOTF based on at least one of the first codeword or the second codeword.

Note that not all of the activities or elements described above in the general description are required, that a portion of a specific activity or device may not be required, and that one or more further activities can be performed, or elements included, in addition to those described. Still further, the order in which activities are listed is not necessarily the order in which the activities are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. A system comprising:
- a display electro-optical transfer function (EOTF) characterization module configured to:
  - provide a graphical user interface (GUI) for display to a user via a display monitor, the GUI including presentation of a set of one or more test patterns;
  - receive user input regarding the set of one or more test patterns via the GUI;
  - determine an approximated EOTF that is representative of an actual EOTF exhibited by the display monitor based on the user input; and
  - determine an inverse EOTF representation of the approximated EOTF;
- a display controller couplable to the display monitor and configured to, for each video image of a stream of video images:
  - convert color values representative of the video image to corresponding codewords based on the inverse EOTF representation; and
  - provide the codewords for transmission to the display monitor.

2. The system of claim 1, wherein:
- the set of one or more test patterns includes at least one of:
  - a first test pattern used to identify a first codeword based on the user's visual detection of a darkest detectable change in luminance in the displayed first test pattern; or
  - a second test pattern used to identify a second codeword based on the user's visual detection of a brightest detectable change in luminance in the displayed second test pattern; and
- the display EOTF characterization module is configured to determine the approximated EOTF based on at least one of the first codeword or the second codeword.

3. The system of claim 2, wherein:
- the first test pattern comprises an array of display boxes, each display box representing a corresponding codeword that increases by one for each successive display box within a row of the array.

4. The system of claim 2, wherein:
- the display EOTF characterization module is further configured to identify at least one of a black level of the display monitor or a peak white of the display monitor based on capability information received from the display monitor; and
- the display EOTF characterization module is configured to determine the approximated EOTF further based on at least one of the identified black level or the identified peak white of the display monitor.

5. The system of claim 4, wherein the display EOTF characterization module is configured to determine the approximated EOTF by:
- determining a dark-region spline based on the black level and the first codeword;
- determining a bright-region spline based on the peak white and the second codeword; and
- generating the approximated EOTF with the dark-region spline in a corresponding dark region of the approximated EOTF, with the bright-region spline in a corresponding bright region of the approximated EOTF, and with a corresponding portion of an ideal EOTF connecting the dark-region spline and the bright-region spline, wherein the ideal EOTF is a representation of a reference EOTF for a luminance range of the display monitor.

6. The system of claim 5, wherein the dark-region spline and the bright-region spline are cubic Hermite splines.

7. The system of claim 1, wherein the inverse EOTF representation is implemented as at least one of: one or more lookup tables (LUTs); hardcoded or programmable logic implementing a piecewise linear function; executable instructions implementing a piecewise linear function; hardcoded or programmable logic implementing a polynomial function; or executable instructions implementing a polynomial function.

8. The system of claim 1, further comprising:
- the display monitor.

9. A system, comprising:
- a display monitor compatible with a video specification having a reference electro-optical transfer function (EOTF) while exhibiting an actual EOTF that deviates from a reference EOFT; and
- a video source subsystem configured to:
  - determine an approximated EOTF representative of the actual EOTF based on user input received from a display of at least one test pattern to a user via the display monitor, the at least one test pattern to elicit input from the user based on a visual inspection of the at least one test pattern by the user;

convert color values of each video image of a stream of video images to corresponding non-linear codewords based on the approximated EOTF; and transmit the codewords to the display monitor for display as display images representative of the video images.

10. The system of claim 9, wherein the user input indicates at least one of:

a first transition point at which the user is able to visually detect a transition from a darkest luminance to a next-darkest luminance of the display monitor; or a second transition point at which the user is able to visually detect a transition from a next-brightest luminance to a brightest luminance of the display monitor.

11. The system of claim 9, wherein:

the at least one test pattern is displayed to the user via a graphical user interface (GUI); and the input is received from the user via the GUI.

12. The system of claim 9, wherein:

the video source subsystem further is configured to determine an inverse EOTF representation of the approximated EOTF; and the video source subsystem is configured to convert the color values to corresponding non-linear codewords using the inverse EOTF representation.

13. The system of claim 12, wherein the inverse EOTF representation is implemented as at least one of: one or more lookup tables (LUTs); hardcoded or programmable logic implementing a piecewise linear function; executable instructions implementing a piecewise linear function; hardcoded or programmable logic implementing a polynomial function; or executable instructions implementing a polynomial function.

14. The system of claim 9, wherein the video source subsystem is configured to generate the stream of video images via at least one of: decoding previously-encoded video data; or rendering of display content.

15. A method, comprising:

providing, from a processing system, a graphical user interface (GUI) for display to a user via a display monitor, the GUI including presentation of a set of one or more test patterns;

receiving, at the processing system, user input based on a visual inspection of the one or more test patterns by the user;

determining, at the processing system, an approximated electro-optical transfer function (EOTF) based on the user input, the approximated EOTF representative of an actual EOTF exhibited by the display monitor; and for each video image of a stream of video images:

converting, at the processing system, color values of the video image to corresponding codewords based on the approximated EOTF; and providing the codewords for transmission from the processing system to the display monitor.

16. The method of claim 15, wherein:

the set of one or more test patterns includes at least one of:

a first test pattern used to identify a first codeword based on the user's visual detection of a darkest detectable change in luminance in the displayed first test pattern; or a second test pattern used to identify second codeword based on the user's visual detection of a brightest detectable change in luminance in the displayed second test pattern; and determining the approximated EOTF comprises determining the approximated EOTF based on at least one of the first codeword or the second codeword.

17. The method of claim 16, wherein:

the first test pattern comprises an array of display boxes, each display box representing a corresponding codeword that increases by one for each successive display box within a row of the array.

18. The method of claim 16, further comprising:

identifying, at the processing system, at least one of a black level of the display monitor or a peak white of the display monitor based on capability information received from the display monitor; and wherein determining the approximated EOTF comprises determining the approximated EOTF further based on at least one of the identified black level or the identified peak white of the display monitor.

19. The method of claim 18, wherein determining the approximated EOTF comprises:

determining a dark-region spline based on the black level and the first codeword;

determining a bright-region spline based on the peak white and the second codeword; and generating the approximated EOTF with the dark-region spline in a corresponding dark region of the approximated EOTF, with the bright-region spline in a corresponding bright region of the approximated EOTF, and with a corresponding portion of an ideal EOTF connecting the dark-region spline and the bright-region spline, wherein the ideal EOTF is a representation of a reference EOTF for a luminance range of the display monitor.

20. The method of claim 15, further comprising:

determining an inverse EOTF representation of the approximated EOTF; and wherein converting the color values to corresponding non-linear codewords comprises converting the color values using the inverse EOTF representation.

21. The method of claim 15, wherein the actual EOTF is based on a reference EOTF modified for a luminance range of the display monitor.

* * * * *